Nov. 10, 1925.

L. M. BOWLUS 1,560,967

ICE BOX

Filed Aug. 27, 1923   3 Sheets-Sheet 1

INVENTOR
L. M. BOWLUS
BY
ATT'YS.

Nov. 10, 1925.  
L. M. BOWLUS  
ICE BOX  
Filed Aug. 27, 1923
1,560,967
3 Sheets-Sheet 2
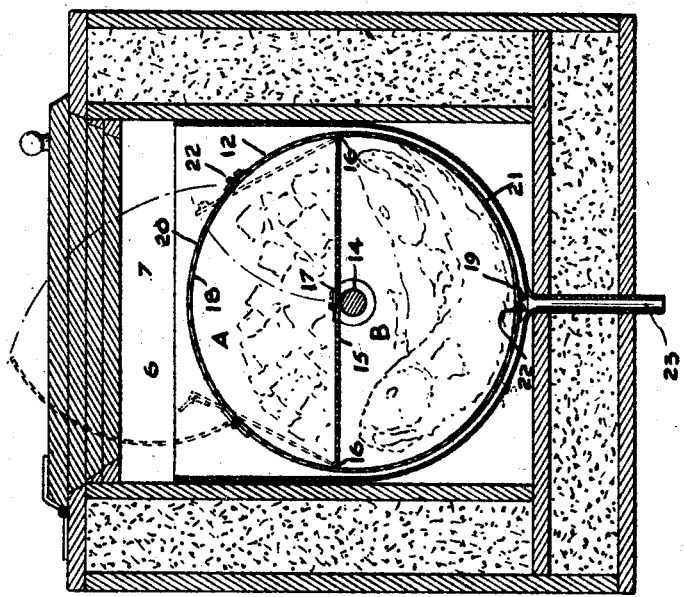
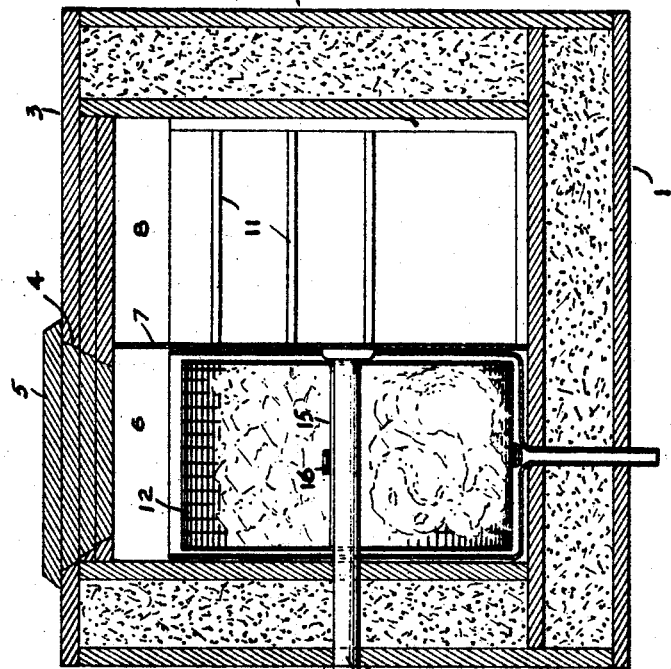
INVENTOR  
L.M. BOWLUS  
ATTYS.

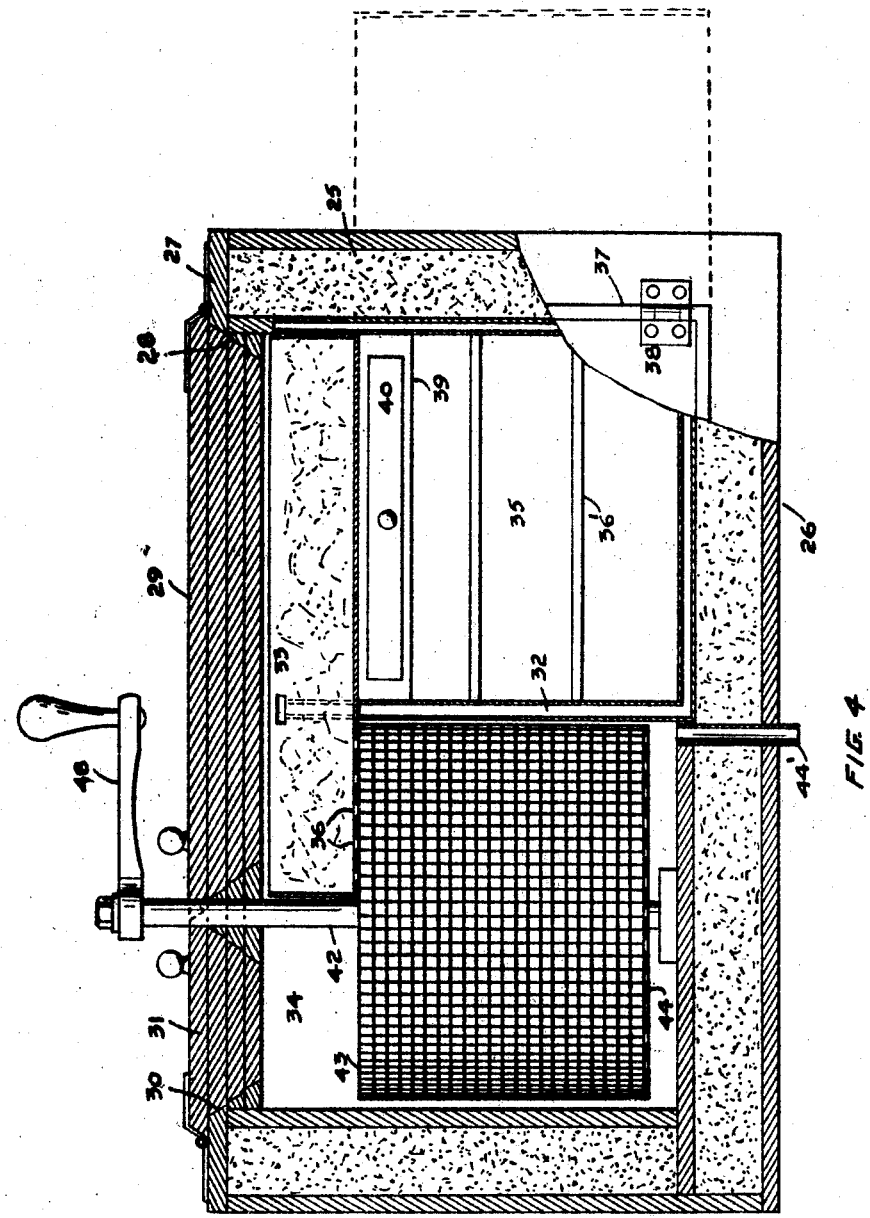

Patented Nov. 10, 1925.

1,560,967

UNITED STATES PATENT OFFICE.

LAUREN M. BOWLUS, OF SAN LUIS OBISPO, CALIFORNIA.

ICE BOX.

Application filed August 27, 1923. Serial No. 659,562.

*To all whom it may concern:*

Be it known that I, LAUREN M. BOWLUS, a citizen of the United States, residing at San Luis Obispo, in the county of San Luis Obispo and State of California, have invented new and useful Improvements in Ice Boxes, of which the following is a specification.

This invention relates to improvements in ice boxes and resides in the provision of a specially constructed ice box which is adapted for preserving fish and other foods and liquids in such manner that the objections which usually attend the storage of fish with other edibles in an ice box are eliminated.

Another object is to provide an ice box which is adapted to receive and preserve in a simple and effective manner foods and liquids which are usually difficult to store in the ordinary ice box.

An object of the invention is to provide an ice box which is constructed so that the odor of fish placed in the box is not taken on by other foods and the presence of fish with other foods, is not made objectionable.

Another object is to provide an ice box of the character described wherein fish and like sea food may be effectively exposed to the ice without actually contacting with the ice and the fish may be moved without disturbing the ice or pack of fish.

A further object of the invention is to provide an ice box of the character described which, although specially adapted for containing and preserving fish, may be used for preserving other foods and for preserving liquids, the arrangement of the box being such that various kinds of foods or liquids may be preserved effectively and disposed in such manner that they may be more readily and easily removed and placed in the box than is the case with the ordinary ice box.

Another object of the invention is to provide an ice box containing a fish and ice storage chamber and a miscellaneous food storing chamber, all of which are arranged in a novel and effective manner for the purpose of preserving the foods in a clean and sanitary manner.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 2 represents a vertical sectional view of the ice box.

Fig. 3 represents a vertical sectional view of the box taken at right angles to Fig. 2.

Fig. 4 represents a vertical sectional view of a modified form of box.

Figure 1:
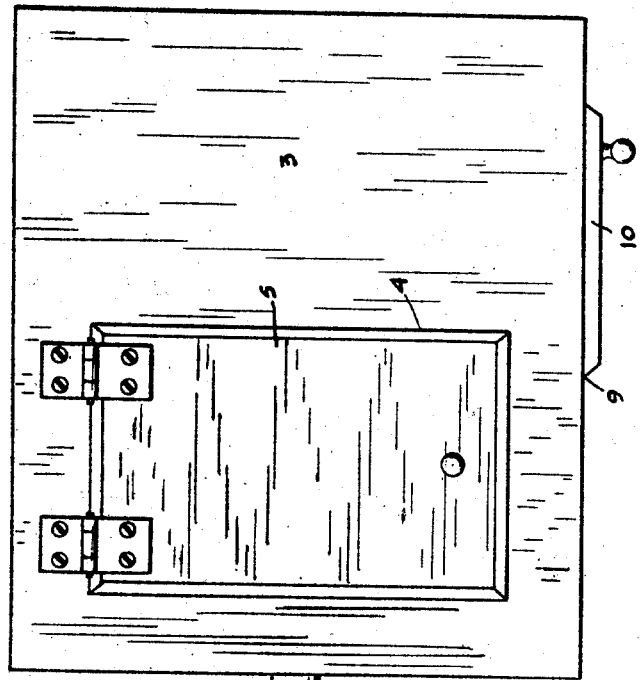
Fig. 1 represents a top plan view of an ice box constructed in accordance with my invention.

The embodiment of the invention shown in the drawing comprises a receptacle of rectilinear outline made up of a bottom wall 1, side walls 2 and a top wall 3, which walls are of any suitable construction so as to thermally insulate the box, such construction being common in the art. The top wall has an opening 4 closed by a hinged lid 5, access being had to a special chamber 6 through said opening. The box is divided by a vertical partition 7 forming said chamber 6 and a food storage chamber 8, access to the latter chamber being had through an opening 9 in one of the side walls, which latter opening is closed by a door 10. The chamber 8 has a plurality of shelves 11 therein arranged as in the ordinary ice box. The partition 7 is a thin metal wall so that the chamber 8 will be cooled by the ice contained in the chamber 6.

Mounted in the chamber 6 is a cylindrical food and ice container 12 which is formed of wire mesh or some other suitable foraminous material. This cylinder is mounted on a horizontal shaft 13 so that it may be rotated. The shaft 13 extends out through one of the walls of the receptacle and has a crank handle 14 fixed thereto whereby the shaft may be turned in order to move the cylinder into different positions. The cylinder is divided by a transverse sectional partition 15 made up in halves, each of which is hinged as at 16 to the circumferential wall of the cylinder. The sections of the partition are adapted to engage upon the shaft 13 and suitable means 17 is provided for fastening the partitions together. This partition is perforated and divides the cylinder so that there is provided an ice compartment A, and a fish compartment B. The circumferential wall of the cylinder at opposite points is provided with openings 18 and 19, permitting access to the chambers A and B respectively. These walls are closed by hinged curved lids 20 and 21 respectively, each of which lids is provided with latches 22 to provide for holding them in place.

When the compartment A is brought into uppermost position and on opening the door 5, access to the chamber A may be had through the opening 4. Thus the chamber A may be filled with ice, preferably broken into small pieces, and after so filling the chamber A, the lid 20 is closed and latched. The cylinder is then turned to bring the opening 19 for the chamber B uppermost and on opening the lid 21, said chamber may be filled with fish or other food, which it is desired to keep cool. After thus filling the chamber B, the handle is operated to bring said chamber into lowermost position as shown in Fig. 2. The water dripping from the ice melting in the chamber A passes through the perforations in the partition 15 and onto the fish, liquids or food contained in the chamber B. This dripping of the ice water on the fish together with the close proximity of the fish to the ice, insures the proper preservation thereof. A suitable drain 23 extends through the bottom wall 1 of the box from the interior of the chamber 6. In some instances the sections of the partition 15 may be swung on their hinges so that the compartments A and B will communicate with one another, this depending on the character of the food to be packed and the manner in which such food is to be packed. The proximity of the chamber 8 containing the food shelves 11 to the ice in the cylinder, maintains said chamber in a cool state, there being only the thin partition wall 7 between the chambers 6 and 8.

When it is desired to remove the fish, the cylinder is turned to bring the opening 19 for the chamber B uppermost and on opening the lid 21 and the door 5, ready access to the fish is had, it being unnecessary to disturb the packing of ice in removing the fish. It will be seen that other foods as well as fish can be effectively stored and preserved in the ice box of my invention, for example, bottled drinks and liquids may be kept exceptionally cold due to the dripping of the ice water from the ice. It will thus be seen that foods placed in the chamber B, are preserved as though packed in ice, although not actually in contact with the ice. Where the fish is stored in the chamber B, the foods stored in the compartment 8 will not take on the odor of the fish or bring about other objections such as usually occur when fish and other foods are placed in the same compartment in an ice box.

Figure 5:
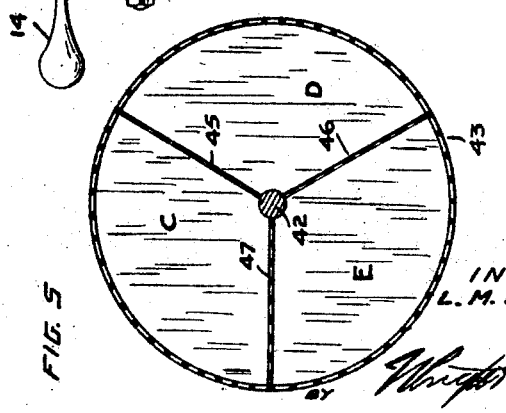
Fig. 5 is a top plan view of the revolving container used in the modified form of box.

Referring to Figs. 4 and 5, I have shown a slightly modified form of the invention wherein the receptacle comprises side walls 25, bottom wall 26 and top wall 27. The top wall 27 is provided with an opening 28 which is adapted to be closed by a hinged door 29, and has a smaller similar opening 30 closed by a corresponding door 31. A vertical partition 32 extends from the bottom wall to a point near but spaced below the top wall. The upper edge of this partition supports an intermediate portion of an ice receptacle 33, which receptacle is open on its upper side and communicates with the opening 28. One end of the receptacle extends beyond the partition 32 into a chamber 34 formed by the partition 32, there being a similar compartment 35 on the other side of the partition. The portion of the receptacle 33 which extends into the chamber 34 has its bottom wall provided with perforations 36 so that the dripping from the ice in the receptacle 33 will fall into the chamber 34. Suitable passages for the purpose of cooling the compartment 35 are directed around the chamber from the ice receptacle 33 in order to cool said compartment 35. The compartment 35 is provided with a plurality of shelves 36' similar to those used in the ordinary ice box. Access to the compartment 35 is had through an opening 37 in the front wall of the box, which opening is closed by a door 38. Immediately beneath the receptacle 33 and in the compartment 35 there is a compartment 39 for supporting a slide drawer 40. This drawer is adapted to contain fish or other food which it is desired to dispose close to the ice and is separated from the compartment 35 in order to prevent odors from the fish coming in contact with other foods in the compartment 35. Mounted on a vertical axle or shaft 42 extending into the compartment 34 through the wall 27, is a cylinder 43 which is provided with a perforated bottom wall 44 and is open on its upper side whereby access to said cylinder may be had through the opening 30 in the wall 27. The upper end of the cylinder 43 terminates directly beneath the perforated portion of the bottom wall of the receptacle 33, which perforated portion extends over approximately one-half of the cylinder so that a portion of the cylinder is at all times in a position to receive the drippings from the receptacle 33. A suitable drain 44' is provided in the lower side of the compartment 34. The cylinder is divided into a plurality of compartments C, D and E, by radial upright partitions 45, 46 and 47. In these compartments fish and other foods or liquids may be stored, for instance in the compartment D, fish may be stored and in the compartments C and E, bottled liquids, such as soda water, may be placed or in fact all of the compartments may be used to contain bottled liquids, which it is desired to cool.

The shaft 42 has a crank handle 48 on its upper end, and by turning this crank handle, any one of the three compartments may be brought into position to receive the ice water dripping through the perforations 30, so that the contents of said receptacle will be quickly and effectively cooled. Since the receptacle extends partly into the compartment 34, said compartment is maintained in a cool state and due to the dripping of ice water from said receptacle 33, the contents of the cylinder may be quickly cooled and maintained in such state. When it is desired to remove, for example, a bottle of the cold soda water, the crank handle is turned so as to bring the chamber which has been resting beneath the perforated part of the ice receptacle and which has been receiving the dripping of ice water, into position beneath the opening 30, the door 31 having been opened. Another of the chambers may be then moved into position beneath the ice receptacle and allowed to remain there for a time sufficient to thoroughly cool the contents thereof. In this way the contents of the compartments in the cylinder may be kept exceptionally cool without requiring handling of said contents and without requiring that such food or liquid to be placed immediately on or against the ice. With the ice box of my invention, the maximum cooling effect of the ice is utilized and this provides for a saving in ice and produces a better and more desirable preservation and cooling of food and liquids placed within the ice box, particularly due to the facility and manner in which the food and liquids may be placed or stored in the box and the facility with which the food or liquid may be removed.

I claim:

1. An ice box comprising a receptacle, an imperforate partition dividing the receptacle into compartments, a foraminated container for food and liquids revolvable on its own axis in one of said compartments, said receptacle having openings therein permitting access to its compartments, closures for said openings and means for moving the revolvable container into different positions with respect to one of said openings to provide for the storing and removing of food and liquids relative to said container.

2. An ice box comprising a receptacle, a revolvable foraminous container within the receptacle, a partition dividing the container into compartments for ice and food respectively, said partition being perforated whereby drippings from the ice when the ice compartment is above the other compartment, will drain into the food compartment, said container having openings for its respective compartment, closures for said openings, said receptacle having an opening therein, a closure for said receptacle opening and means for moving the revolvable container into position to permit of access through the receptacle opening to either of said compartments in the container.

3. An ice box comprising a receptacle, a revolvable container within the receptacle, a partition dividing the container into compartments for ice and food respectively, said partition being perforated whereby drippings from the ice when the ice compartment is above the other compartment, will drain into the food compartment, said container having openings for its respective compartments, closures for said openings, said receptacle having an opening therein, a closure for said receptacle opening and means for moving the revolvable container into position to permit of access through the receptacle opening to either of said compartments in the container, said container being in the form of a cylinder and having a foraminated cylindrical wall.

4. An ice box comprising a receptacle, a revolvable container within the receptacle, a partition dividing the container into compartments for ice and food respectively, said partition being perforated whereby drippings from the ice when the ice compartment is above the other compartment, will drain into the food compartment, said container having openings for its respective compartment, closures for said openings, said receptacle having an opening therein, a closure for said receptacle opening, means for moving the revolvable container into position to permit of access through the receptacle opening to either of said compartments in the container, a partition dividing the receptacle into two compartments, in one of which the container is mounted, food supporting shelves in the other compartment of the receptacle, said receptacle having an opening permitting access to the last named compartment and a door for said last named compartment.

5. An ice box comprising a receptacle having a cylindrical container revolvable therein, said cylindrical wall of the container being foraminated, a partition comprising hinged sections extending across the container and dividing the latter into compartments, one of which is for ice and the other for food, said partition being perforated, said cylindrical wall being provided with openings permitting access to the compartments, closures for said openings, said receptacle having an opening through one of its walls, a closure for said opening and means for rotating the container into position to bring the opening for either compartment of the container immediately beneath the opening in said receptacle to permit access to said compartment.

6. An ice box comprising a receptacle having a cylindrical container revolvable therein, said cylindrical wall of the container being foraminated, a partition comprising hinged sections extending across the container and dividing the latter into compartments, one of which is for ice and the other for food, said partition being perforated, said cylindrical wall being provided with openings, said receptacle having an opening through one of its walls, a closure for said opening and means for rotating the container into position to bring the opening for either compartment of the container immediately beneath the opening in said receptacle to permit access to said compartment, a partition in said receptacle dividing the receptacle into compartments in one of which the container is mounted and in the other of which food is adapted to be placed.

LAUREN M. BOWLUS.